Feb. 26, 1935.  T. LECHELT  1,992,703
PERCUSSIVE TOOL
Filed March 10, 1933
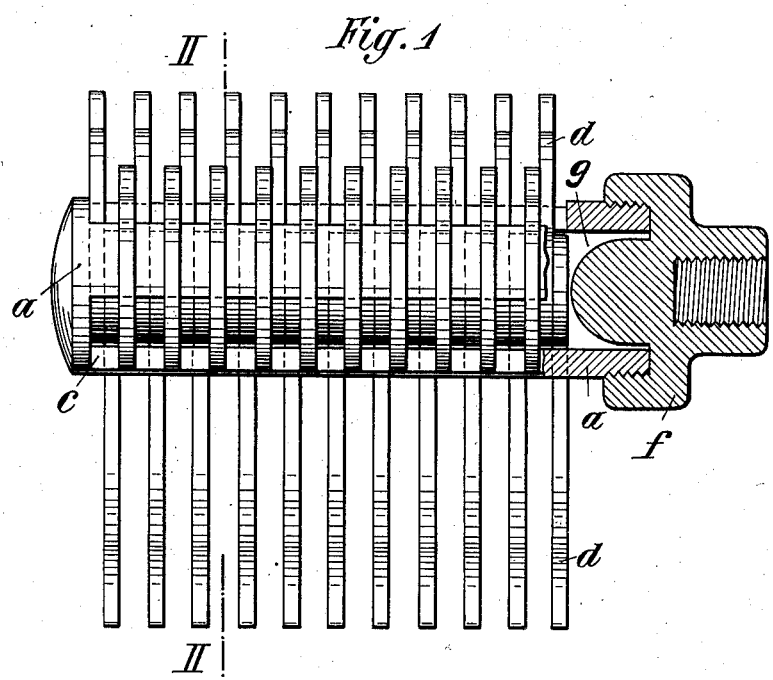
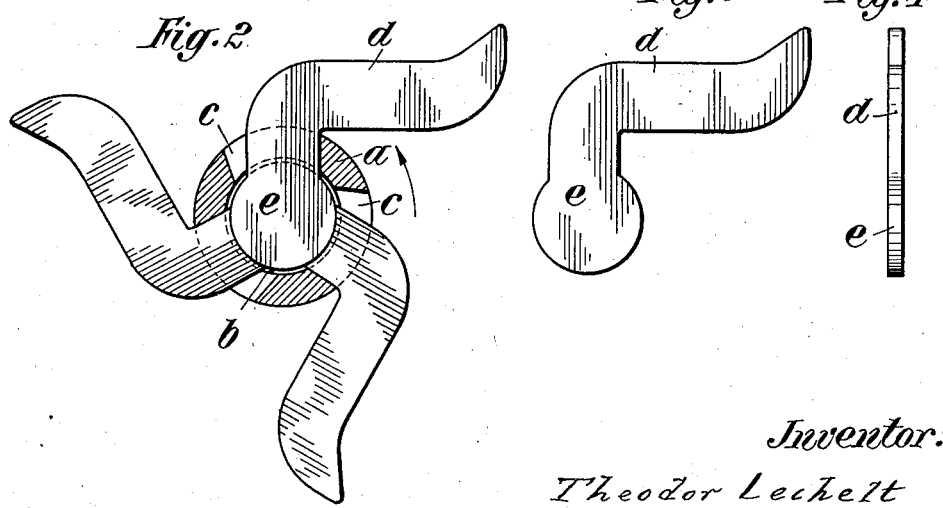
Inventor:
Theodor Lechelt
By _____
Attorney.

Patented Feb. 26, 1935

1,992,703

UNITED STATES PATENT OFFICE 1,992,703

PERCUSSIVE TOOL

Theodor Lechelt, Amsterdam, Netherlands

Application March 10, 1933, Serial No. 660,291
In Germany March 11, 1932

9 Claims. (Cl. 29—81)

This invention relates to rotary percussive tools such as are used inter alia for cleaning and removing rust from surfaces of all kinds, such as boilers, ships' hulls and iron constructions, as well as for working concrete or stone and for many other purposes. Percussive tools of this kind are known in which the tools are expanded into the form of plates at the ends at which they are clamped and are arranged in rows adjacent one another in cylindrical longitudinal grooves in the holder, the grooves being slotted longitudinally for the introduction of the tools and being closed by means of a cap. This cap is connected with a shaft which may be flexible and is driven by an electric motor for example. A tool of this type is shown for instance in U. S. Patent No. 1,856,299.

Hitherto the grooves in which the tools were mounted have been arranged eccentrically with respect to the axis of the tool holder and distance pieces provided between the individual tools. In this arrangement impact moments arise which render the manipulation more difficult. In order to overcome this disadvantage, according to the present invention the ends of all the tools are disposed in a central bore in the tool holder, i. e., on the axis thereof, and abut directly against each other therein.

Preferably the clamping of the ends of the tools in the central bore is effected in such manner that in the use of the percussive device the tools can assume a setting inclined somewhat to the central axis. This is particularly advantageous if the device is to be used for operating on riveted iron constructions in which case the rivet heads can be treated much more readily by positioning the tools obliquely.

A percussive device according to the invention is shown by way of example in the accompanying drawing in which:

Fig. 1 shows a side view of the device in part section

Fig. 2 is a cross section.

Figs. 3 and 4 show a single tool in two views at right angles.

The tool holder $a$ consists of a hollow cylinder closed at one end, the walls of which are provided with longitudinal slots $b$ corresponding to the number of rows of tools and uniformly spaced peripherally. The central bore $b$ serves to receive the enlarged plate- or disk-shaped ends $e$ by means of which the tools $d$ are clamped, the tools $d$ projecting outwardly through the slots $c$. The slots $c$ permit the introduction of the tools from the open end of the tool holder. The width of the slots is less than the diameter of the plate- or disk-shaped ends of the tools but greater than the width of the tools where they pass through the slots, so that the tools are free to move somewhat in the direction of rotation during use. The diameter of the central bore $b$ is somewhat greater than the diameter of the ends $e$ of the tools so that the latter can assume a somewhat oblique position in the holder.

In the embodiment shown, three rows of tools offset at 120° with respect to each other, are provided. Tools are introduced in turn into the three longitudinal slots $c$ with the ends $e$ immediately adjacent or superimposed. However, the individual tools $d$ in each row are spaced apart by an amount equal to twice the thickness of a tool, but in their entirety the tools constitute a coherent unbroken working surface.

The possibility of the tools assuming an oblique position is afforded only if they are loosely clamped in the tool holder. The length of the central bore $b$ is therefore made somewhat greater than the total thickness of the clamping ends of all the tools. For this purpose also, the closure cap $f$ of the tool holder is furnished with a ball-ended pin $g$ which passes into the central bore $b$ and forms an abutment for the tools.

All the tools are mounted in one and the same groove in the tool holder, i. e., in the central bore. Spacing discs are dispensed with. Impact forces such as occur when the tools are arranged eccentrically, cannot arise. The device is therefore very convenient to handle.

I wish it to be understood that I do not limit myself to the one embodiment of my invention as shown and described merely by way of example. Various other constructional forms differing from that one in details are possible, without constituting departures from the invention.

I claim:

1. A rotary percussive device, comprising, a rotary tubular body member having a plurality of longitudinal slots therein, a plurality of striking tools arranged adjacent each other in the body member and extending through the slots, the tools having widened inner ends arranged coaxially with their centers substantially in the longitudinal axis of the body member and being adapted to prevent substantial radial movements of the striking tools.

2. A percussive device according to claim 1, in which one end of the body member is provided with means so that the device may be attached to a rotary driving means.

3. A percussive device according to claim 1, in which the body member is closed at one end and the other end is provided with a closure cap having a projection to abut against the adjacent striking tool to maintain the tools adjacent each other.

4. A rotary percussive device, comprising, a rotary tubular body member having a plurality of longitudinal slots therein, the width of each slot being less than the diameter of the bore of said body member, and a plurality of striking tools arranged adjacent each other in the body member and extending outwardly from said bore through said slots, the tools having widened inner ends arranged coaxially and with their centers substantially in the longitudinal axis of the body member and being adapted to prevent substantial radial movements of the striking tools.

5. A rotary percussive device, comprising, a rotary tubular body member having a plurality of longitudinal slots therein, the width of each slot being less than the diameter of the bore of said body member, and a plurality of striking tools arranged adjacent each other in the body member and extending outwardly from said bore through said slots, the tools having widened inner ends arranged coaxially and with their centers substantially in the longitudinal axis of the body member and being adapted to prevent substantial radial movements of the striking tools, the breadth of the shanks of said tools being less than the width of the said slots.

6. A rotary percussive device, comprising, a rotary tubular body member having a plurality of longitudinal slots equally distributed in its periphery, the width of each slot being less than the diameter of the bore of said body member, and a plurality of striking tools arranged adjacent each other in the body member and extending outwardly from said bore through said slots, the tools having widened inner ends arranged coaxially and with their centers substantially in the longitudinal axis of the body member and being adapted to prevent substantial radial movements of the striking tools.

7. A rotary percussive device, comprising, a rotary tubular body member closed at one end and open at the other end and having a plurality of longitudinal slots therein, the width of each slot being less than the diameter of the bore of said body member, a plurality of striking tools extending outwardly from said bore through said slots and following one another in the axial direction of the said bore, the size of the inner ends of said tools corresponding to the diameter of the body member bore, and a cap fixed on the open end of the said body member and having an approximately semi-spherical inner projection extending into said open body member and contacting with the rearmost of the inner tool ends.

8. A rotary percussive device, comprising a rotary tubular body member having a plurality of longitudinal slots equally distributed therein, the width of each slot being less than the diameter of the bore of said body member, a plurality of striking tools arranged adjacent each other in the body member and extending outwardly from said bore through said slots in staggered arrangement to be evenly distributed around the said body member, and widened inner ends on said striking tools arranged coaxially and with their centers substantially in the longitudinal axis of the body member and being adapted to prevent substantial radial movements of the striking tools, the length of the bore being greater than the total thickness of the ends of the tools mounted therein.

9. A rotary percussive device, comprising, a rotary tubular body member closed at one end and open at the other end and having a plurality of longitudinal slots equally distributed in its periphery, the width of each slot being less than the diameter of the body of said body member, a plurality of striking tools extending outwardly from said bore through said slots and following one another in the axial direction of the said bore, the breadth of the shanks of said tools being less than the width of the said slots, and the size of the inner ends of the said tools corresponding to the diameter of the body member bore, the length of the bore being greater than the total thickness of the ends of the tools mounted therein, and a cap fixed to the open end of said body member and having an approximately semi-spherical inner projection extending into said open body member and contacting with the rearmost of the inner tool ends.

THEODOR LECHELT.